United States Patent [19]

Nguyen et al.

[11] Patent Number: 6,041,343

[45] Date of Patent: Mar. 21, 2000

[54] METHOD AND SYSTEM FOR A HYBRID PEER-SERVER COMMUNICATIONS STRUCTURE

[75] Inventors: Binh Q. Nguyen; Richard J. Redpath, both of Cary; Sandeep Kishan Singhal, Raleigh, all of N.C.

[73] Assignee: International Business Machines Corp., Armonk, N.Y.

[21] Appl. No.: 08/769,564

[22] Filed: Dec. 19, 1996

[51] Int. Cl.[7] .................................................. G06F 13/00
[52] U.S. Cl. ......................... 709/203; 709/219; 709/236
[58] Field of Search ............................... 370/85.13, 408, 370/352, 338, 56, 466, 218, 396; 368/7; 709/231, 203, 219, 236; 364/514; 375/222, 1; 379/93

[56] References Cited

U.S. PATENT DOCUMENTS

| 5,285,449 | 2/1994 | Georgiou | 370/85.13 |
|---|---|---|---|
| 5,539,743 | 7/1996 | Amemiya et al. | 370/85.1 |
| 5,592,538 | 1/1997 | Kosowsky et al. | 379/93 |
| 5,608,448 | 3/1997 | Smoral et al. | 348/7 |
| 5,633,869 | 5/1997 | Burnett et al. | 370/396 |
| 5,761,433 | 6/1998 | Billings | 709/231 |
| 5,790,553 | 8/1998 | Deaton, Jr. et al. | 370/466 |
| 5,822,523 | 10/1998 | Rothschild et al. | 709/236 |
| 5,822,529 | 10/1998 | Kawai | 709/219 |
| 5,838,683 | 11/1998 | Corley et al. | 370/408 |
| 5,913,028 | 6/1999 | Wang et al. | 709/203 |
| 5,933,412 | 8/1999 | Choudhurry et al. | 370/218 |

OTHER PUBLICATIONS

Hac,A . Bandwidth management in the switch with Various traffice burstiness. IEEE, 1991.

Lixia et al . RSVP: A New Resource Reservation Protocol. IEEE, Sep. 1993.

Roy et al . Peer–toPeer & Network–based Multimedia Bridging Architectures. IEEE, Mar. 1996.

Mehra et al . Resource Management for Real time Communication: Making Theory Meet Practice. IEEE, Feb. 1996.

Meshulam. Real Time Networking of Control Systems. IEEE, Jan. 1990.

*Primary Examiner*—Frank J. Asta
*Assistant Examiner*—Thong Vu
*Attorney, Agent, or Firm*—A. Bruce Clay; Myers, Bigel, Sibley & Sajovec, P.A.

[57] ABSTRACT

Server capacity is increased on a network computer system. A total number of peers that an individual client will communicate with directly is determined. Then, a total number of clients handled by a server interconnected to the individual client is reduced by the determined total number or peers.

19 Claims, 7 Drawing Sheets

Client-server clustering to establish multicast groups for the server to communicate information. Multiple servers.

METHOD AND SYSTEM FOR A HYBRID PEER-SERVER COMMUNICATIONS STRUCTURE

TECHNICAL FIELD OF THE INVENTION

The present invention relates in general to computer software, and in particular, to a method and system for combining the advantages of client server communications and peer-to-peer communications in a multi-user network.

BACKGROUND OF THE INVENTION

The advent of the World Wide Web (WWW) and the Internet has enabled the emergence of a new set of applications. Using a web browser, users can interact with a variety of applications running on remote machines. For example, the WWW transparently integrates a variety of protocols, such as HTTP, FTP and Gopher. Furthermore, the HTTP server can transparently forward a client's request to a Common Gateway Interface (CGI) application for further processing. This simple mechanism has enabled a spectrum of applications running on the Internet, including workflow management, banking transactions, commercial advertisement, information services, and entertainment.

The interactivity on the Internet is ever increasing. Applications supporting interactive group training, collaborative authoring, multi-user games, text and audi-based chat, and video conferencing have been able to enter the mainstream of Internet usage. In such applications, multiple users interact with each other by exchanging real-time information, such as audio, video, text, position and orientation in the virtual world. However, limited network bandwidth and processing capability have represented a challenging obstacle to deploying such services. To support many thousands of users simultaneously in a real-time interactive environment, an application must support users with a wide range of computer and networking capabilities. Critical data about the users should be shared in a fashion that allows instant access by various application components running on different hosts.

Most currently available commercial multi-user platforms rely on a single central server, which puts a limit on the scalability (i.e., the number of clients that can be served) of the system and increases latency (i.e., the amount of time delay from send to receive) on the connected user, since the information has to go to the server first, before being forwarded to the user who is to receive the information. One solution which reduces latency for the connected user is "Peer-to-Peer" communication, which also increases scalability by reducing the load on the server. This solution becomes unmanageable if the connected user is limited to a slow communication line, such as, for example, a modem.

A possible solution for client-server lack of scalability is the Spline server technology available from the Mitsubishi Electric Research Laboratory. Although the load on individual servers is reduced by Spline, latency is still apparent (and may be higher than the strict client-server case).

Client server systems need to be scalable and provide a realistic model for multi-user connectivity. Thus, a need exists for a method system for providing a scalable system which can support a large number of users, reduce latency where possible, and provide optimal connectivity within and between intranet and Internet environments.

SUMMARY OF THE INVENTION

One object of the present invention is to provide a method for a scalable multi-user communication system. In addition, it is an object of the invention to reduce latency for user connectivity in a seamless manner. Another object of the invention is to provide scalability without assumptions which restrict the use of the communication system within certain types of networks. Another object is to enable applications to defer decisions about their communication topologies until they are executed.

The present invention uses bandwidth management to make decisions to reduce latency and provide scalability. The availability of uni-cast and multi-cast connections for communications will be utilized whenever possible by the connected user and the server. In accordance with one aspect of the present invention, server capacity is increased on a network computer system. A total number of peers than an individual client will communicate with directly is first determined. Then, a total number of clients handled by a server interconnected to the individual client is reduced by the determined total number of peers.

BRIEF DESCRIPTION OF THE DRAWINGS

For a more complete understanding of the present invention, and for further advantages thereof, reference is now made to the following detailed description, taken in conjunction with the accompanying drawings, in which.

DETAILED DESCRIPTION OF THE INVENTION

Figure 1:
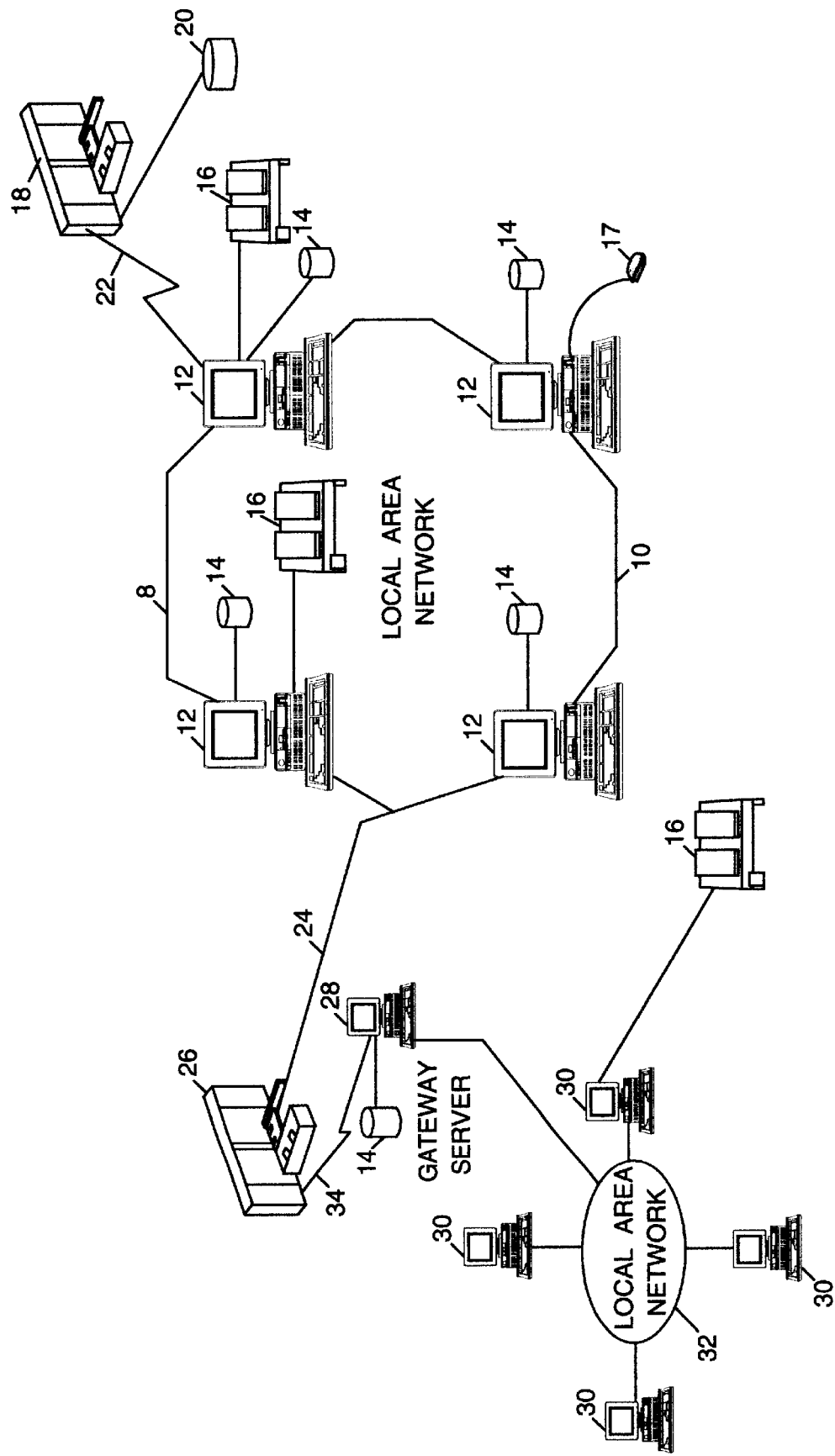
FIG. 1 illustrates a computer system in which the present invention may be utilized.

Referring to FIG. 1, there is depicted a graphical representation of a data processing system 8, which may be utilized to implement the present invention. As may be seen, data processing system 8 which may comprise, for example, the Internet or an intranet, may include a plurality of networks, such as local area networks (LAN) 10 and 32, each of which preferably includes a plurality of individual computers 12 and 30, respectively, or a plurality of processors coupled by one or more means of communication such as LAN, WAN, shared memory, etc. Of course, those skilled in the art will appreciate that a plurality of Intelligent Work Stations (IWS) coupled to a host processor may be utilized for each such network. As is common in such data processing systems, each individual computer may be coupled to a storage device 14 and/or a printer/output device 16 and may be provided with a pointing device such as mouse 17.

The data processing system 8 may also include multiple mainframe computers, such as mainframe computer 18, which may be preferably coupled to LAN 10 by means of communications link 22. The mainframe computer 18 may also be coupled to a storage device 20 which may serve as remote storage for LAN 10. Similarly, LAN 10 may be coupled via communications link 24 through a subsystem control unit/communications controller 26 and communications link 34 to a gateway server 28. Gateway server 28 is preferably an individual computer or IWS which serves to link LAN 32 to LAN 10.

With respect to LAN 32 and LAN 10, a plurality of documents or resource objects may be stored within storage device 20 and controlled by mainframe computer 18, Resource Manager, or Library Service with the resource objects thus stored. Of course, those skilled in the art will appreciate that mainframe computer 18 may be located a great geographic distance from LAN 10 and similarly LAN 10 may be located a substantial distance from LAN 32. For example, LAN 32 may be located in California while LAN 10 may be located within North Carolina and mainframe computer 18 may be located in New York.

Software program code which employs the present invention is typically stored in the memory of a storage device 14 of a stand alone workstation or LAN server from which a developer may access the code for distribution purposes, the software program code may be embodied on any of a variety of known media for use with a data processing system such as a diskette or CD-ROM, or may be distributed to users from a memory of one computer system over a network of some type to other computer systems for use by users of such other systems. Such techniques and methods for embodying software code on media and/or distributing software code are well-known and will not be further discussed herein.

Figure 2:
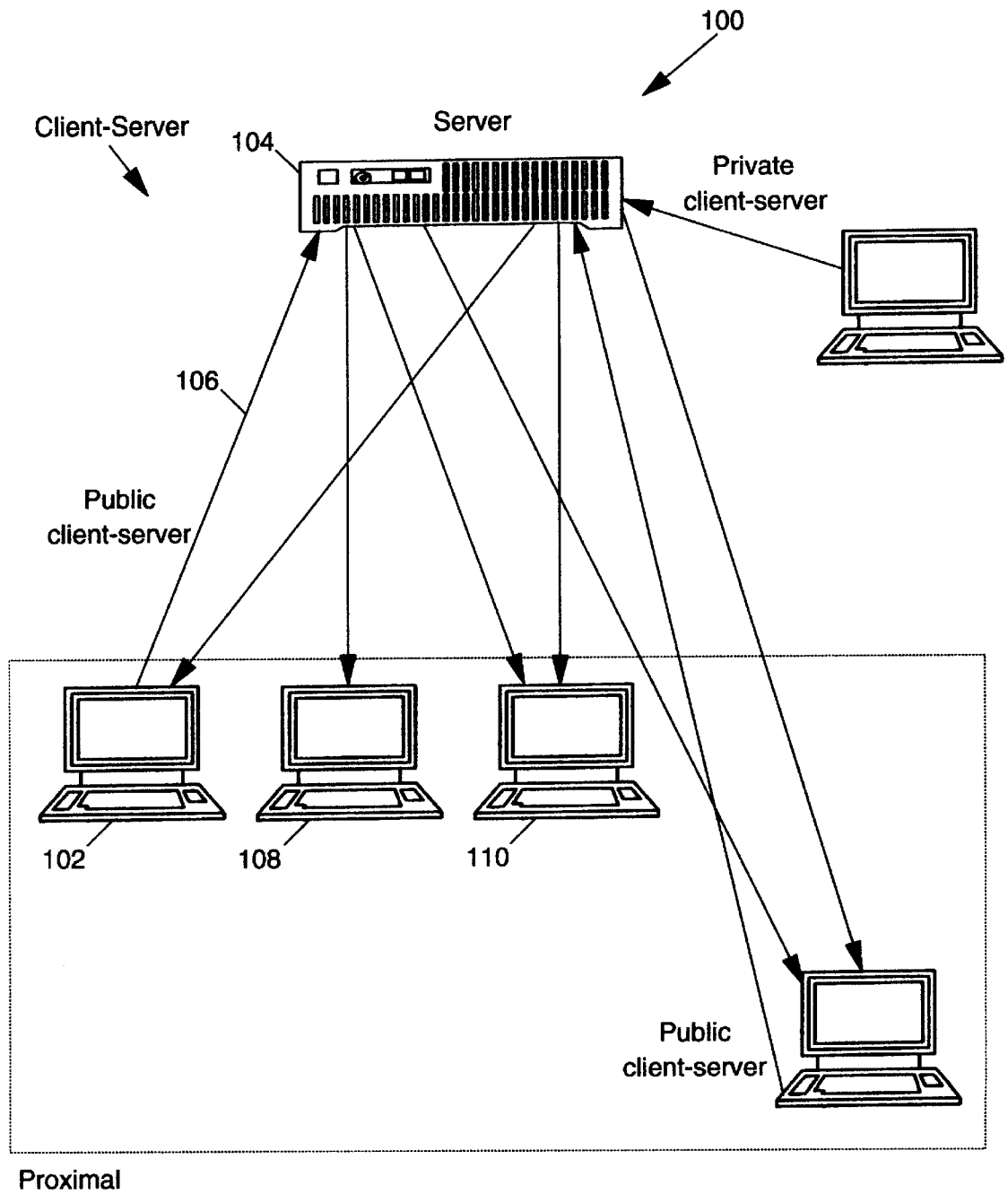
FIG. 2 is a graphical illustration of a client server architecture in accordance with the prior art.

Referring next to FIG. 2, a traditional client-server environment, generally indicated by reference numeral 100, is illustrated. In the client-server environment 100, a client 102 which may be, for example, an individual computer 12 (see FIG. 1) transmits all outgoing real-time data to a server 104 via a transmission line 106. The server 104 is responsible for retransmitting the data to the appropriate one or more clients 108 or 110, for example, based on the transmission mode of the packet. This model imposes extra latency on the real-time data because the packets must travel to their destinations via a circuitous route from the initial client to the server and then to the destination client. However, this model generally requires minimal network bandwidth and computation power at the client host because the client only needs to transmit each data packet one time. Thus, this client-server model is most appropriate for personal computers connected to the Internet over dial-up modem links.

Figure 3:
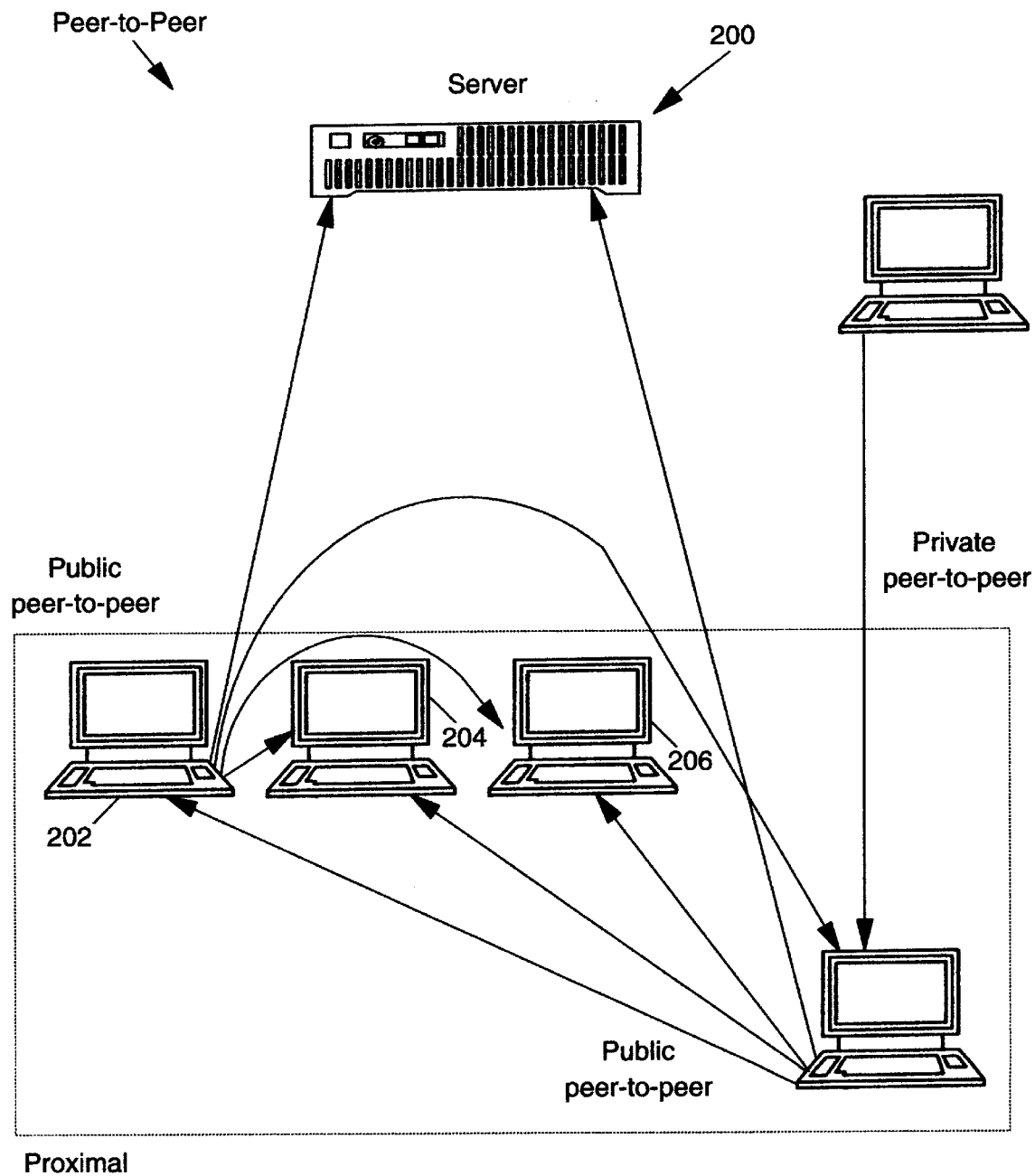
FIG. 3 is a graphical representation of a peer-to-peer system in accordance with the prior art.

Referring to FIG. 3, a strict peer-to-peer environment 200 is illustrated. In the peer-to-peer environment 200, a client 202 transmits all outgoing real-time data directly to the destination peer or peers such as, for example, client 204 and client 206. The strict peer-to-peer environment minimizes the latency on real-time data packets because information is routed by the most direct path to its destination. However, in the absence of multi-cast transmission lines, the peer-to-peer environment requires considerably more bandwidth along the client's network link and imposes a greater load on the client's processor because each packet is transmitted multiple times. Consequently, the peer-to-peer system is most suitable for a high powered work station connected to a T-1 or better network link having multicast capabilities.

Figure 4:
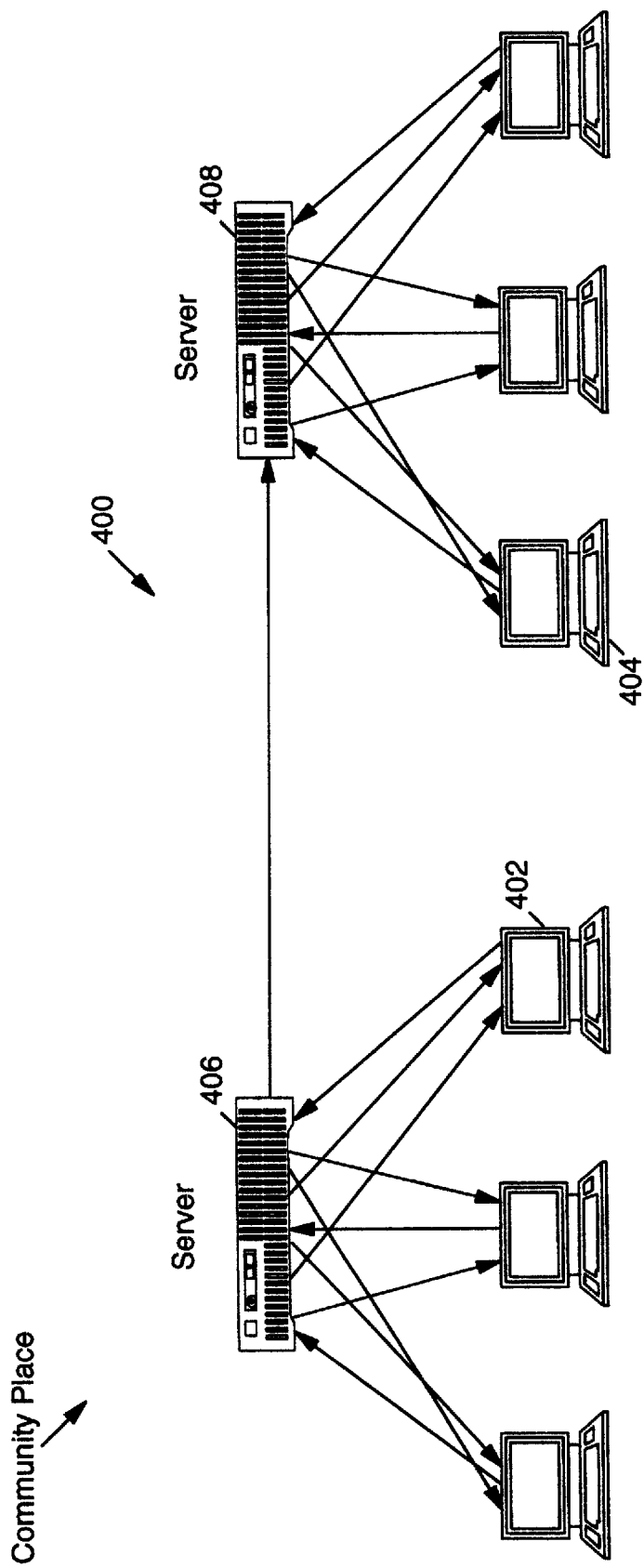
FIG. 4 is a graphical representation of a community place system in accordance with the prior art.

Referring to FIG. 4, a Spline type environment 400 is shown. In the environment 400, a transmission from a client 402 to a client 404 would first go through a server 406 to a server 408 and finally to the client 404. The Community Place environment may contain a plurality of servers which themselves communicate via peer-to-peer protocols. By providing multiple servers, the Community Place environment may improve scalability but the Community Place environment does not reduce the latency. Optionally, clients may be permitted to participate via peer-to-peer protocols, but they must make a binary decision between operating in a low-bandwidth client-server mode or a high-bandwidth peer-to-peer mode.

Figure 5:
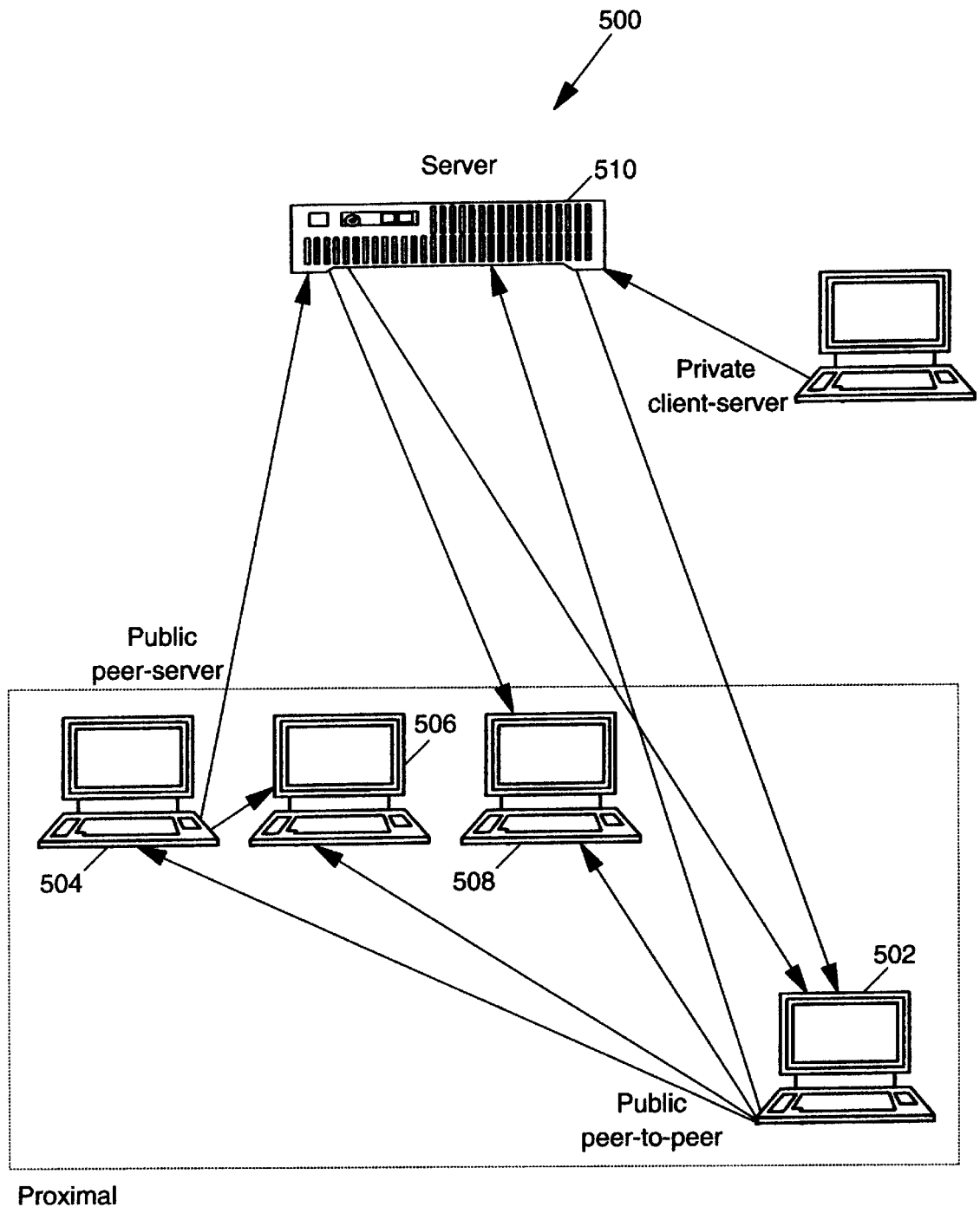
FIG. 5 is a graphical representation of the present invention.

Referring to FIG. 5, a hybrid environment 500 integrates a pure client-server and pure peer-topeer option. Under the hybrid environment 500, a client 502 transmits outgoing real-time data directly to a subset of destination peer clients, for example, to client 504, client 506 and client 508, while relying on a server 510 to transmit data to any remaining destinations. This hybrid offers each client with a spectrum of communication options, effectively allowing the client to select the appropriate bandwidth/latency tradeoff for its outbound data dynamically at any time. Notably, at it's extremes, the hybrid environment 500 supports a pure client-server and a pure peer-to-peer model. To operate in the hybrid environment 500, a client provides the server with its peer-to-peer capacity (M). To transmit data, the client transmits the data to members of the distribution list until the peer-to-peer capacity (M) is reached; and then simply lists the remaining peers in the packet sent to the server. If the identity of the distribution list's remaining elements is known by the server, then the client may forego transmitting the distribution list to the server. As a consequence, transmission latency is reduced for those distribution processes/networks that receive data in a peer-to-peer fashion, and a total number of clients (N) available for service by the server may be positively adjusted upward as the individual peer-to-peer capacity relieves the load on the server. The server may also use knowledge of M to limit the number of peer addresses that it provides to the client.

Figure 6:
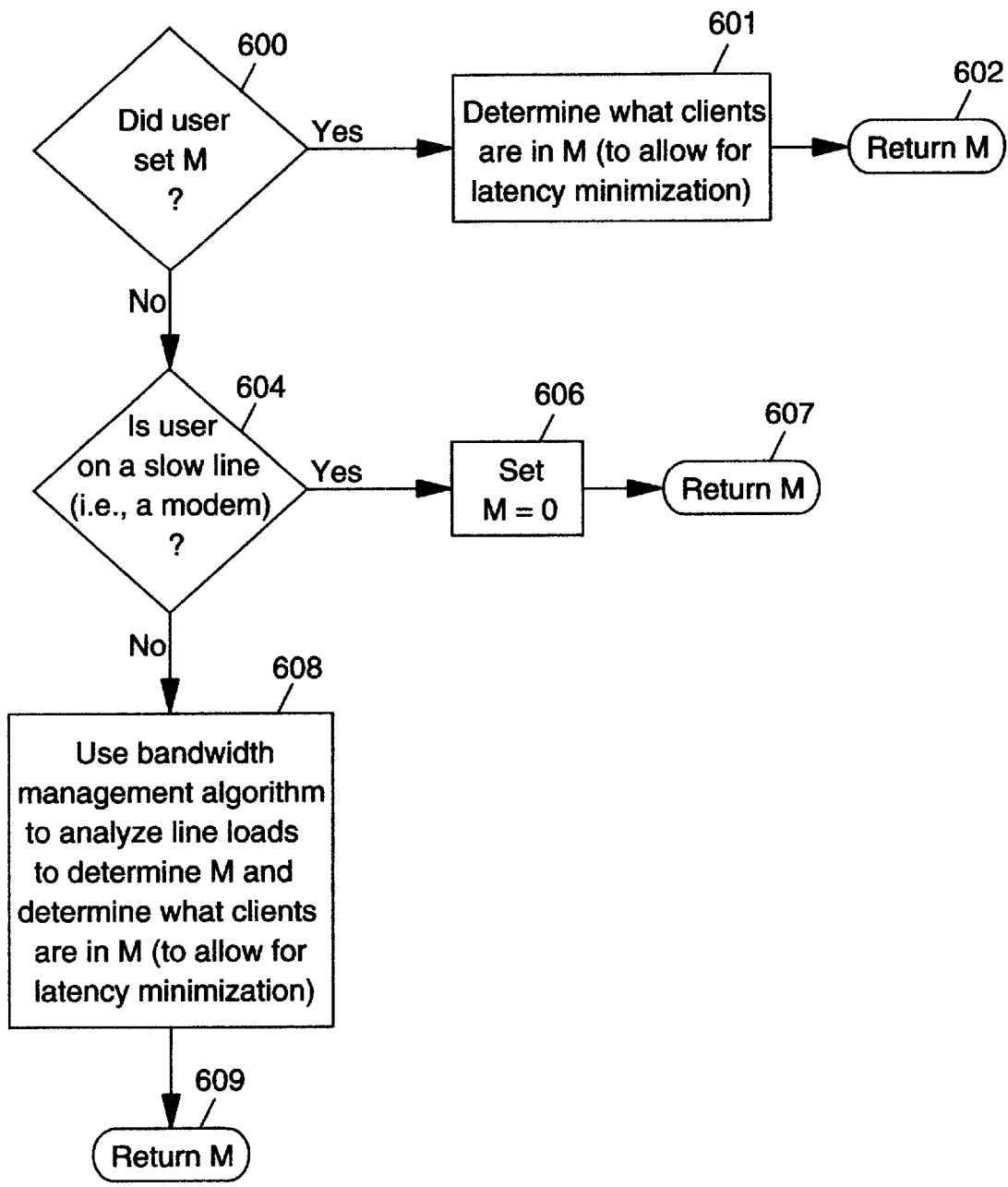
FIG. 6 is a high level flowchart for the determination of M.

Referring to FIG. 6, a flowchart for the determination of the number of peer-to-peer capacity (M) is shown. In decision block 600, it is determined whether or not a user has set a value for M. It is possible with the present invention that a user may simply enter a number for M into a dialog and thus set the value. If the response to the decision 600 is yes, the present invention sets the peer-to-peer capacity and manages the set of clients allocated to the M peer-to-peer capacity so as to minimize latency at block 601 and the peer-to-peer capacity (M) is set at 602. If the response to decision block 600 is no, it is determined at decision block 604 whether or not the user is on a slow transmission line such as, for example, a modem. If the response to decision block 604 is yes, M is set equal to zero at block 606 and M=0 is returned at 607. If the response to decision block 604 is no, a bandwidth management algorithm (beyond the scope of this invention) is used to analyze line loads to determine M, and the present invention determines what clients are in M to allow for latency minimization at block 608. The value for M is returned at 609.

Figure 7:
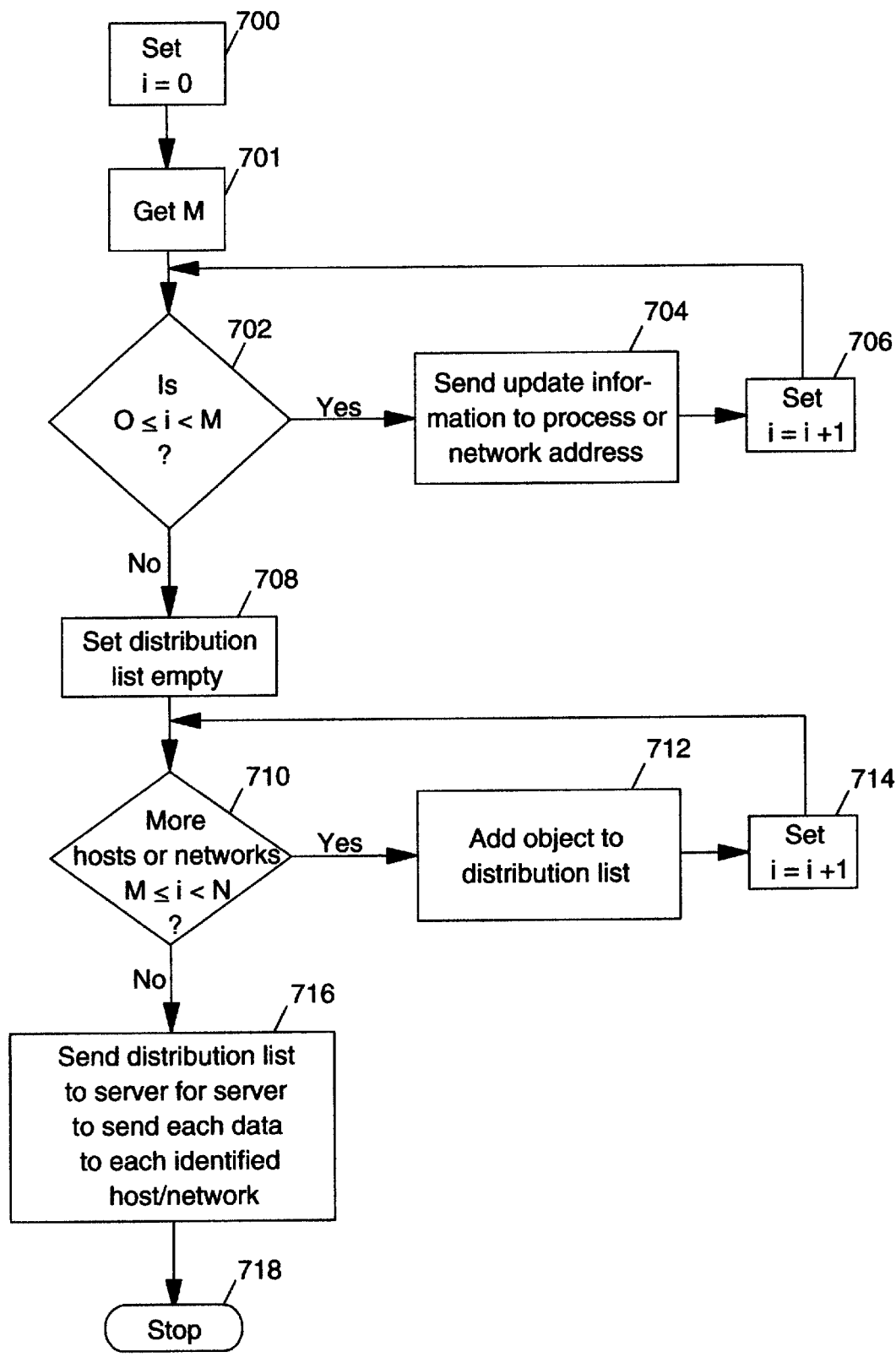
FIG. 7 is a high level flowchart illustrating the present invention.

Referring to FIG. 7, a high level flowchart illustrates the use of the present invention once M has been calculated per FIG. 6. At block 700, a variable I is set equal to zero, and at block 701 M is obtained. It is then determined at decision block 702 whether or not I is greater than or equal to zero and less than M. If it is determined at decision block 702 that the response is yes, update information is sent to a host or network identifier at block 704. At block 706, I is incremented by one and the present invention returns to decision block 702. If the response to decision block 702 is no, a distribution list is set empty at block 708. It is then determined in decision block 710 whether the packet must be sent to additional hosts (i.e., the total number of clients serviceable by the server). If the response to decision block 710 is yes, a host or network identifier is added to the distribution list at 712. The variable I is then incremented by one at block 714, followed by a return to decision block block 710. If the response to decision block 710 is no, the distribution list and data is sent to the server in order to allow the server to send each identified host or network data at block 716. The present invention then stops at 718.

As a simplified example, assume one user has a T1 communication line capable of handling 10 clients directly (M=10). In addition, there are three other clients that need to receive data. Thus, by using the present invention, the user's system will handle ten clients directly while the server only needs to handle three. This saves the server from handling ten communication updates and essentially increases the server's capacity while simultaneously reducing the latency seen by the ten recipients serviced directly by the sender.

If there are fourteen such users each talking to 13, the server will only need to update 42 (14×3) of the 182 (14×13) active communication paths. If M were zero for each user rather than ten, the server would have to handle all updates or 182 (14×13) instead of only 42. Obviously, as users and capacities expand by factors of ten or more, the savings to the server become even more dramatic.

Sample Java source code, which may be used to implement the present invention, could be:

```
public void sprayPrivate(Peer[]group,Packet data){
    int length=group.length;
    int min=(length>capacity)?capacity: length;
    for (int I=0;i<min; ++I)
    Group[i].comm.update(data);
    if (min>capacity) {Vector list=new Vector( );
    for (int j=min; j<capacity; j++)
    list.add (group[]);
    server.update (data.setDistribution(list)); }
```

Although the present invention has been described with respect to a specific preferred embodiment thereof, various changes and modifications may be suggested to one skilled in the art, and it is intended that the present invention encompass such changes and modifications as falls in the scope of the appended claims.

We claim:

1. A method of increasing server capacity on a network computer system, comprising the steps of:

determining a total number of destination addresses that an individual client will directly communicate with so as to provide a peer address total;

assigning a plurality of destination addresses peer addresses with which the individual client communicates directly or server addresses corresponding to destination addresses handled by a server interconnected to the individual client on the network such that destination addresses are assigned as peer addresses until the peer address total is reached to thereby reduce a total number of destination addresses handled by the server by up to the peer address total;

wherein any destination addresses in excess of the peer address total are assigned as server addresses; and communicating utilizing the peer addresses.

2. The method of claim 1, wherein said total number of destination addresses is set by said individual client.

3. The method of claim 1, where in said total number of destination addresses is set by a bandwidth management algorithm.

4. The method of claim 1, wherein addresses assigned as server addresses are known to said server and said individual client is not required to inform said server of an identity of said addresses.

5. The method of claim 1, wherein said server knows said peer address total and limits a number of unsolicited destination addresses provided to a destination of said individual client.

6. The method of claim 1, wherein said server can minimize latency by selecting said peer address total.

7. The method of claim 1, wherein at least one of said peer addresses comprises a multicast address-space.

8. The method of claim 1, wherein said client performs any encryption or data format translation to enable communication to said peer addresses.

9. The method of claim 8, wherein said server provides necessary encryption keys or other data format information to enable communication to said peer addresses supplied by said server.

10. A system for increasing server capacity on a computer network, comprising:

means for determining a total number of destination addresses that an individual client will directly communicate with so as to provide a peer address total;

means for assigning a plurality of destination addresses as peer addresses with which the individual client communicates directly or server addresses corresponding to destination addresses handled by a server interconnected to the individual client on the network such that destination addresses are assigned as peer addresses until the peer address total is reached to thereby reduce a total number of destination addresses handled by the server by up to the peer address total;

wherein any destination addresses in excess of the peer address total are assigned as server addresses; and means for communicating utilizing the peer addresses.

11. The system of claim 10, wherein said total number of destination addresses is set by said individual client.

12. The system of claim 10, wherein said total number of destination addresses is set by a bandwidth management algorithm.

13. The system of claim 1, wherein addresses assigned as server addresses are known to said server and said individual client is not required to inform said server of an identity of said addresses.

14. The system of claim 10, wherein said server knows said peer address total and limits a number of unsolicited destination addresses provided to a destination of said individual client.

15. The system of claim 10, wherein said server can minimize latency by selecting said peer address total.

16. The system of claim 10, wherein at least one of said peer addresses comprises a multicast address space.

17. The system of claim 10, wherein said client performs any encryption or data format translation to enable communication to said peer addresses.

18. The system of claim 17, wherein said server provides necessary encryption keys on other data format information to enable communication to said peer addresses supplied by said server.

19. A computer program product recorded on computer readable medium for increasing server capacity on a computer network, comprising:

computer readable means for determining a total number of destination addresses that an individual client will directly communicate with so as to provide a peer address total;

computer readable means for assigning a plurality of destination addresses as peer addresses with which the individual client communicates directly or server addresses corresponding to destination addresses handled by a server interconnected to the individual client on the network such that destination addresses are assigned as peer addresses until the peer address total is reached to thereby reduce a total number of destination addresses handled by the server by up to the peer address total;

wherein any destination addresses in excess of the peer address total are assigned as server addresses; and computer readable means for communicating utilizing the peer addresses.

* * * * *